United States Patent

[11] 3,559,953

[72] Inventor Alexander Litchard
 322 N. Main St., Wellsville, N.Y. 14895
[21] Appl. No. 766,732
[22] Filed Oct. 11, 1968
[45] Patented Feb. 2, 1971

[54] TRUCKS
 4 Claims, 4 Drawing Figs.
[52] U.S. Cl................................................. 254/8,
 280/47.24
[51] Int. Cl..................................................... B62b 11/00
[50] Field of Search........................................... 280/47.24,
 43.23, 46, 43; 214/370, 384; 254/8

[56] References Cited
 UNITED STATES PATENTS
 1,533,987 4/1925 Germond..................... 280/46
 2,358,801 9/1944 Gerdes........................ 280/47.26X
 2,597,765 5/1952 Welburn...................... 280/47.24
 3,038,622 6/1962 Quayle..................... 214/370

FOREIGN PATENTS
 572,043 3/1933 Germany...................... 280/43
 532,861 1/1941 Great Britain................ 280/47.24
 862,534 3/1961 Great Britain................ 280/43

Primary Examiner—Benjamin Hersh
Assistant Examiner—John A. Pekar
Attorney—Shlesinger, Arkwright & Garvey ABSTRACT: This disclosure is of a truck which is small in size but constructed to transport heavy loads positioned on pallets. These trucks are handled manually to position them in relation to a pallet and are then connected with a power-operated vehicle by means of handles which are first moved into a more nearly horizontal position to lift the pallet to a slight extent with one end thereof resting on the ground or floor, in which position the pallet is then moved from one position to another without materially changing the pallet from a horizontal position.

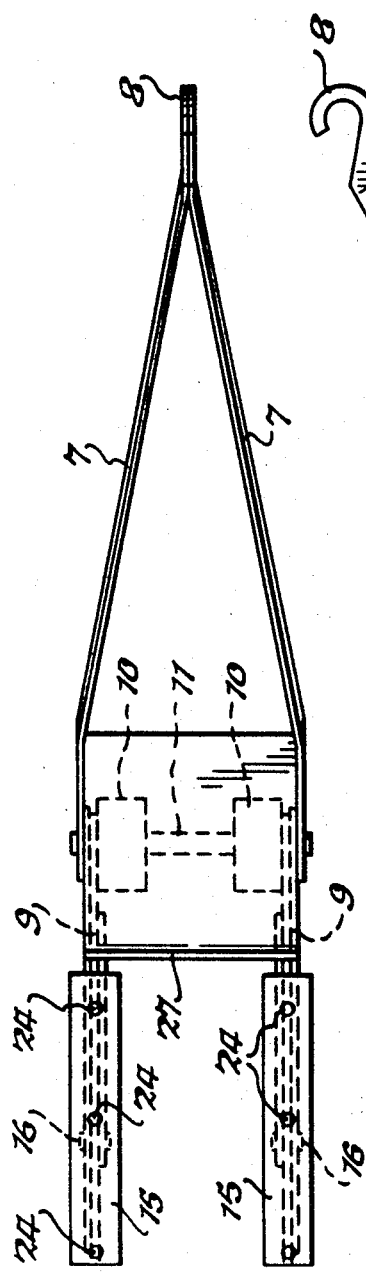
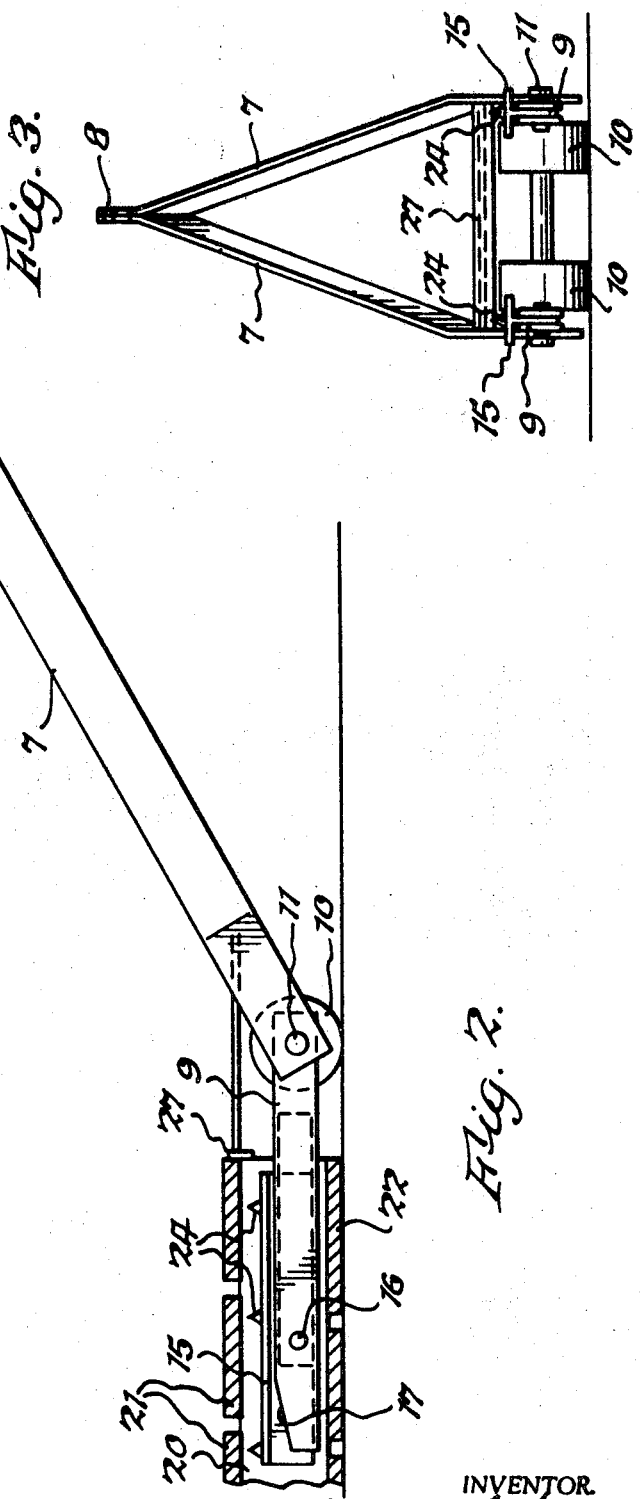
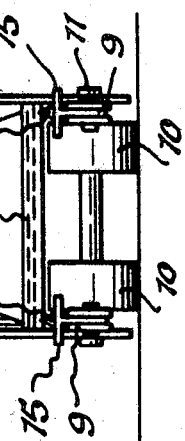

TRUCKS

In the accompanying drawing:

FIG. 1 is a top plan view of a truck or transporting device embodying this invention.

FIG. 2 is a side view thereof.

FIG. 3 is an end view thereof.

Figure 4:
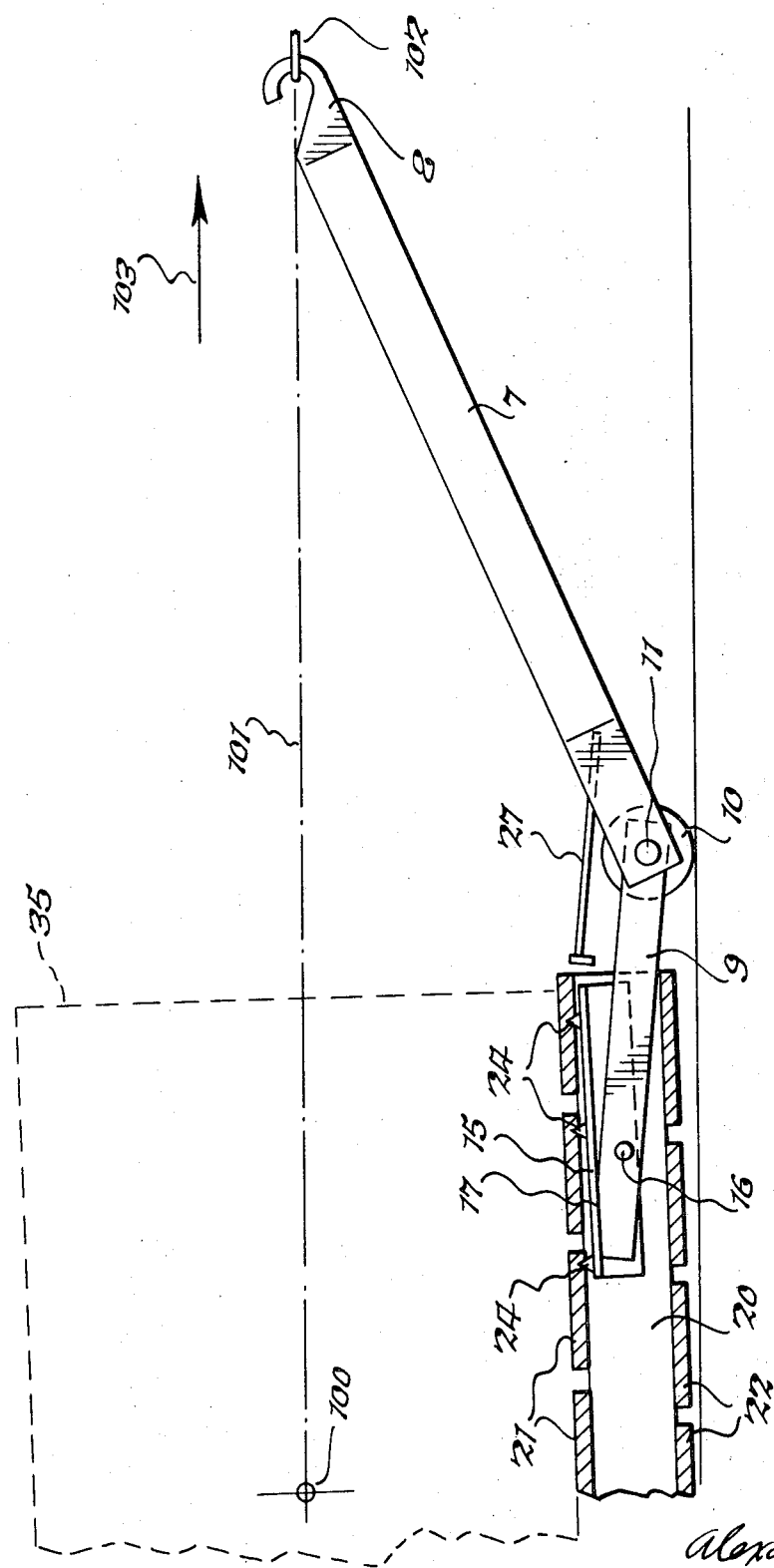
FIG. 4 is a side view thereof showing the device positioned in operative relation to a pallet for transporting the same.

This improved truck includes a handle which, as shown in FIGS. 1 and 3, comprises two parts or branches 7 which are connected at their outer ends and rigidly secured to a hook 8 or other device by means of which the truck may be moved by a power actuated device. The two branches of the handle are secured at their lower ends to a fork which comprises two prongs or parts 9 which are spaced apart. This structure including the branches of the handle and the fork are supported on wheels 10 which may be mounted on a shaft 11 extending across the lower ends of the handle and the prongs 9 and which may, if desired, serve to space these parts relatively to each other. It will thus be obvious that the shaft also forms a fulcrum about which the handle and fork may swing so that when the handle is lowered or swung downwardly the two forks will be raised.

Each of the prongs of the fork has mounted adjacent to the ends thereof a tread 15 pivoted at 16 on the fork. Each tread in its normal position will rest on a horizontal part of each fork, and the ends of the prongs of the fork are provided with inclined surfaces 17 which are spaced from the pivot member 16 in such a manner that the treads may swing about their pivots 16 to inclined positions in which the outer portions of the treads rest upon the inclined edges 17 of the prongs of the fork.

The improved truck is intended primarily for use in connection with pallets which are customarily loaded with heavy materials such, for example, as metal bars, rods or the like, so that the transportation of these pallets when loaded cannot be accomplished by means of an ordinary handtruck. With the use of my improved truck, the fork with the two treads mounted thereon may be inserted under the load supporting surface or floor of a pallet, as shown in FIG. 4.

These pallets which are a standard commodity comprise three upright beams or frame members 20 having a horizontal floor or supporting surface 21 formed of planks to their upper edges and similar planks 22 secured to their lower edges. The fork of the improved truck is inserted under the floor members 21 of the pallet at opposite sides of the central supporting beam 20 and the purpose of the truck is to lift one end of the pallet when the fork 9 is moved upwardly. As seen in FIG. 4, the treads do not extend throughout the full length of the pallet but support one end only thereof and consequently when the handle 7 is moved downwardly, the fork and the tread supported thereon are raised, thus lifting only one end of the pallet.

As a rule, these pallets, when loaded, are much too heavy to be moved by manpower only, and consequently a power device of some type is attached to the hook member 8 of the truck after the truck is inserted manually under the floor of the pallet. The power device, when attached to the handle for moving the same forwardly, will initially swing the same downwardly to some extent and thus raise the fork and the treads to a slight extent, as shown for example in FIG. 4. The power device can then move the partially lifted pallet by dragging the rear end thereof on a floor or other supporting surface. When the pull on the handle 7 is released the truck permits the pallet to be lowered and the truck to be removed therefrom.

In order to enable the truck to firmly grip the lower face of the floor member 21 of the pallet, I provide the upper face of each tread with means for gripping said pallet, such for example, as short spikes or projections 24 secured to each tread and which when the tread is raised, will extend into the underfaces of the boards or planks 21 of the pallet so that during the pull of the truck to move the pallet while partly supported on the floor or other surface, the spikes will firmly hold the pallet against slipping from the treads of the truck.

The truck is also provided with a stop member 27 rigidly mounted on the handle 7 and which is pushed against the pallet or the load supported on the pallet when the truck is moved into operative position. This stop member is in the form of a plate with a downwardly extending flange which will engage the pallet or load supported thereon when the truck has been pushed under the pallet to the desired extent. This stop member preferably extends throughout the width of the space between the lower ends of the two parts of the handle and is welded or otherwise secured thereto so that it serves to space the two parts of the handle in correct relation to each other.

The inclination of the handle 7 is such that the pull on the handle can only lift the pallet and the load 35 mounted thereon to a slight extent so that the load on the pallet is not materially moved from its upright position, as shown in FIG. 4.

When operating with heavy loads, such as would normally be supported on the pallet, it is very important that the load be supported without any material tilting of the same and consequently the forward tilting of the pallet would be prevented by the contact of the treads 15 with the flat upper edges 17 of the two prongs of the fork extending approximately from the pivot 16 to the handle, and swinging in the opposite direction is prevented by contact of the treads with the inclined surface 17 of the two parts of the fork.

In the operation of my improved truck, as illustrated by way of example in FIG. 4, 100 is in the vertical plane of the center of gravity of the load on the pallet 101 represents the line of pull exerted by a power device on the link 102. It will be seen in FIG. 4 that the load on the pallet has been lifted at one end thereof only to a small extent above the floor. Thus the center of gravity is shifted to the left only a small amount and the line of pull being approximately in line with the center of gravity, drags the load in a horizontal direction to the right, as indicated by the arrow 103.

It will now be seen that the load is lifted only to a degree sufficient to allow the pulling force to overcome the friction between the back of the pallet and the floor and is thus transported in a direction to the right by the power vehicle.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A truck comprising:
   a. a pair of axially spaced heavy-duty roller wheels mounted on a common shaft which extends through both roller wheels;
   b. an upwardly extending elongated handle angularly disposed to the ground at an angle substantially less than 90° and having a towline engaging device at the upper end thereof;
   c. the handle at its lower end having a pair of spaced branch members pivotally mounted on the shaft close to the roller wheels;
   d. a pair of laterally spaced prong members approximately half the length of the handle which are pivotally mounted at one end on the axle and extend in a common plane in a horizontal direction away from the handle;
   e. the pivotally mounted end of each prong member being integrally connected to the pivoted end of a corresponding branch member at an angle substantially greater than 90°.
   f. a laterally spaced pair of tread members extending substantially parallel to and disposed above the prong members and displaced outwardly from the roller wheels;
   g. each tread member having a flat upper pallet engaging surface with upwardly extending integral spikes which bite into the underside of a pallet to preclude relative movement between the underside of the pallet and the upper surface of the tread member;

h. pivotal support means connecting a central portion of the tread members to the prong members adjacent the free end thereof for permitting small angular movement of the tread members to keep the upper surface thereof in continual full contact with the underside of the pallet; and i. the obtuse angle between the handle and the prong members being such that depression of the handle by a linearly applied pull by a towline will raise the prong members and their associated tread members a sufficient distance to engage the underside of the pallet and lift that portion of the pallet upwardly from the ground to prove clearance for dragging the pallet along the ground supported by the truck at the forward end of the pallet and the pallets rear bottom surface at its other end.

2. The truck of claim 1, wherein:

a. the pivotal connection includes a downwardly inclined upper surface at the end of the prong members; and b. a pivot which passes through the prong member behind the inclined surface and through a central portion of the tread member below its upper surface.

3. The truck of claim 1, including a separate stop member integrally connected to the truck for keeping the edge of the pallet spaced rearwardly of the roller wheels.

4. The truck member of claim 3, wherein:

a. the pivotal connection includes a downwardly inclined upper surface at the end of the prong members; and b. a pivot which passes through the prong member behind the inclined surface and through a central portion of the tread member below its upper surface.